United States Patent
Lindemann et al.

(10) Patent No.: US 9,657,823 B2
(45) Date of Patent: May 23, 2017

(54) TORQUE CONVERTER WITH TURBINE MASS ABSORBER

(71) Applicant: Schaeffler Technologies GmbH & Co. KG, Herzogenaurach (DE)

(72) Inventors: Patrick Lindemann, Wooster, OH (US); Chad Mieczkowski, Avon, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 313 days.

(21) Appl. No.: 14/505,718

(22) Filed: Oct. 3, 2014

(65) Prior Publication Data

US 2015/0020512 A1    Jan. 22, 2015

Related U.S. Application Data

(63) Continuation of application No. 13/084,404, filed on Apr. 11, 2011, now Pat. No. 8,881,515.

(60) Provisional application No. 61/323,309, filed on Apr. 12, 2010.

(51) Int. Cl.
*F16H 45/02* (2006.01)
*F16F 15/134* (2006.01)
*F16F 15/133* (2006.01)

(52) U.S. Cl.
CPC ......... *F16H 45/02* (2013.01); *F16F 15/133* (2013.01); *F16F 15/1343* (2013.01); *F16F 15/13484* (2013.01); *F16H 2045/0205* (2013.01); *F16H 2045/0231* (2013.01); *F16H 2045/0247* (2013.01); *F16H 2045/0278* (2013.01)

(58) Field of Classification Search
CPC ............... F16F 15/133; F16F 15/1343; F16F 15/13484; F16H 45/02; F16H 2045/0231; F16H 2045/0205; F16H 2045/0247; F16H 2045/0278
See application file for complete search history.

(56) References Cited

U.S. PATENT DOCUMENTS

| | | | |
|---|---|---|---|
| 4,033,436 | A | 7/1977 | Hoetger et al. |
| 4,844,216 | A | 7/1989 | Fukushima et al. |
| 5,937,984 | A | 8/1999 | Kimura |
| 6,347,574 | B1 | 2/2002 | Guentert et al. |
| 6,561,330 | B2 | 5/2003 | Maienschein et al. |
| 6,840,758 | B2 | 1/2005 | Babin et al. |
| 7,243,647 | B2 | 7/2007 | Pianezze |

(Continued)

FOREIGN PATENT DOCUMENTS

JP    2007-192360    8/2007

OTHER PUBLICATIONS

CN Office Action for Application No. JP 201180018440.4, mailed Aug. 20, 2014 by the China State Intellectual Property Office related to U.S. Appl. No. 13/084,404, filed Apr. 11, 2011.

*Primary Examiner* — Logan Kraft
(74) *Attorney, Agent, or Firm* — Kevin L. Parks

(57) ABSTRACT

A piston plate assembly for a torque converter comprising: an aperture including a chamfer portion; and, a bushing installed in the aperture and including a radius portion proximate the chamfer portion, wherein the bushing is arranged to seal the piston directly to a transmission input shaft and the radius portion is arranged to ease assembly of the bushing onto the input shaft.

16 Claims, 7 Drawing Sheets

(56) References Cited

U.S. PATENT DOCUMENTS

| | | | |
|---|---|---|---|
| 8,484,960 B2 * | 7/2013 | Vansickle | F16H 45/02 60/366 |
| 2004/0185940 A1 | 9/2004 | Yamamoto et al. | |
| 2005/0239557 A1 | 10/2005 | Wack et al. | |
| 2006/0000682 A1 | 1/2006 | Yamamoto et al. | |
| 2007/0017767 A1 | 1/2007 | Breier | |
| 2009/0013682 A1 | 1/2009 | Vansickle | |
| 2009/0125202 A1 | 5/2009 | Swank et al. | |

* cited by examiner

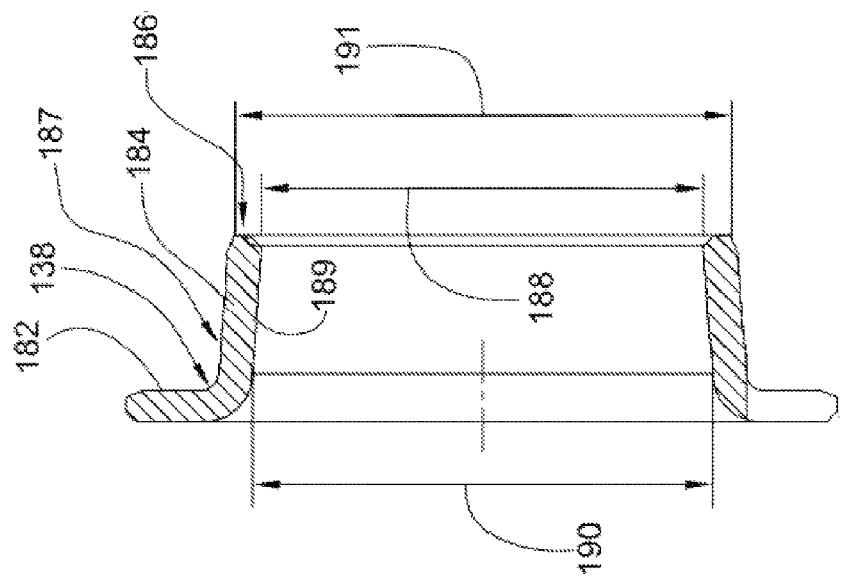
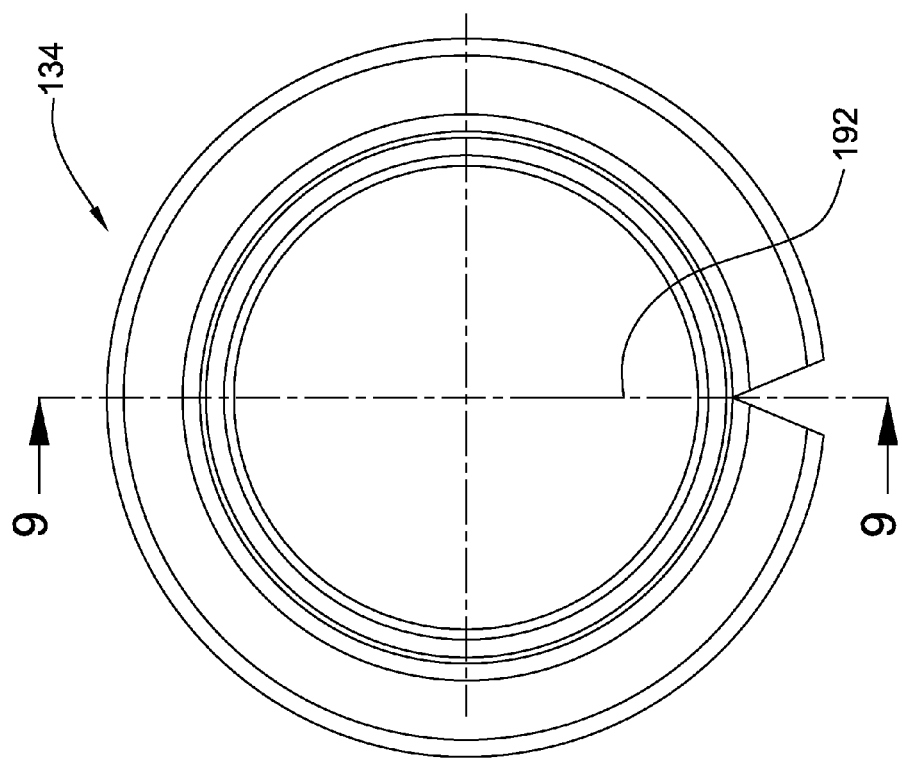
Fig. 8
Fig. 9

TORQUE CONVERTER WITH TURBINE MASS ABSORBER

CROSS-REFERENCE TO RELATED APPLICATIONS

This application is a continuation of U.S. application Ser. No. 13/084,404, filed Apr. 11, 2011, which claims the benefit of U.S. Provisional Application No. 61/323,309, filed Apr. 12, 2010, which applications are incorporated herein by reference.

FIELD

The invention relates generally to a torque converter, and more specifically to a torque converter configured with a turbine mass absorber.

BACKGROUND

Turbine mass absorbers are known. One example is shown in commonly-assigned United States Patent Application Publication No. 2009/0125202 A1, herby incorporated by reference herein.

BRIEF SUMMARY

Example aspects broadly comprise a damper assembly for a torque converter including a drive side elastic element arranged for transmitting torque to a turbine for the torque converter in a first direction and a coast side elastic element, separate from the drive side elastic element, arranged for transmitting torque to the turbine in a second direction opposite the first direction. In an example embodiment, a slope of a torque curve for the damper remains constant in a transition region between transmitting torque to the turbine in the first direction and transmitting torque to the turbine in the second direction. In an example embodiment, the damper assembly includes an input damper and an output damper. The elastic elements are disposed in a torque path between the input damper and the output damper. In an example embodiment, the input damper is selectively engaged with a cover for the torque converter and the output damper is drivingly engaged with an output hub for the torque converter.

In an example embodiment, the damper assembly includes the turbine with a drive tab in contact with the drive side and coast side elastic elements. In an example embodiment, in a free state, the drive side and coast side elastic elements are compressed by the drive tab and the coast side elastic element is arranged to be at least partially compressed when the drive side elastic element is fully compressed. In an example embodiment, the drive side elastic element is arranged to be at least partially compressed when the coast side elastic element is fully compressed. In an example embodiment, when the drive side elastic element is fully compressed by the drive tab, the coast side elastic element urges the drive tab in the first direction. In an example embodiment, when the coast side elastic element is fully compressed by the drive tab, the drive side elastic element urges the drive tab in the second direction.

Other example aspects broadly comprise a torque converter including a cover drivingly engaged with a prime mover, a first spring set clutchingly engaged with the cover, an output hub arranged for driving engagement with an input shaft for a transmission, and a second spring set drivingly engaged with the output hub. The converter also includes a connection plate disposed in a torque path between the first and second spring sets, a turbine, and a third spring set separate from the first and second spring sets and disposed in a torque path between the connection plate and the turbine. In some example embodiments, the third spring set includes a drive side spring and a coast side spring, and the turbine includes a tab disposed between the drive side spring and the coast side spring. In an example embodiment, the turbine includes a shell and the tab is fixedly attached to the shell by welding, brazing, adhesive, or mechanically fixed by a rivet or blade tab.

In an example embodiment, the turbine includes an outer diameter and an inner diameter, the first spring set is disposed radially proximate the outer diameter, the second spring set is disposed radially proximate the inner diameter, and the third spring set is disposed radially between the first and second spring sets. In some example embodiments, the torque converter includes a lash element in a torque path between the turbine and the connection plate. The third spring set has a defined torque capacity, and the lash element drivingly engages the turbine with the connection plate when a torque transmitted by the turbine exceeds the torque capacity. In an example embodiment, the lash element is a spacer rivet disposed in a slot.

In an example embodiment, the torque converter includes a lash element fixedly connected to the turbine and passing through a slot in the connection plate. The turbine is at least partially rotatable with respect to the connection plate and, when a portion of the third spring set is fully compressed, the lash element drivingly engages the turbine with the connection plate.

Other example aspects broadly comprise a piston plate assembly for a torque converter including an aperture having a chamfer portion and a bushing installed in the aperture and having a radius portion proximate the chamfer portion. The bushing is arranged to seal the piston to a transmission input shaft and the radius portion is arranged to ease assembly of the bushing onto the input shaft. In an example embodiment, the bushing includes a low friction coating. In an example embodiment, the bushing includes an annular portion and an axial protrusion including a distal end and a radial taper. A diameter of the protrusion proximate the distal end is less than a diameter of the protrusion proximate the annular portion. In an example embodiment, the bushing includes a circumferential discontinuity and is formed by rolling.

Other example aspects broadly comprise a piston plate assembly for a torque converter including a piston plate having an opening forming an inner circumferential surface at a distance from an axis of rotation for the piston plate and a radial surface and a chamfer surface connecting the inner circumferential surface with the radial surface. The assembly also includes a bushing with an axial portion in contact with the inner circumferential surface and a radial portion extending from a first end of the axial portion and in contact with the radial surface An outside diameter of the axial portion at a second end of the axial portion, opposite the first end, is less than the distance. The outside diameter of the axial portion increases from the second end to the first end.

In an example embodiment, during insertion of the bushing into the opening, contact between the axial portion and the chamfer surface facilitates axial displacement of the bushing along the inner circumferential surface. In an example embodiment, the radial portion is discontinuous in a circumferential direction.

BRIEF DESCRIPTION OF THE DRAWINGS

The nature and mode of operation of the present invention will now be more fully described in the following detailed description taken with the accompanying drawing figures, in which:

FIG. 8 is a back view of a bushing; and,

FIG. 9 is a cross-section view of the bushing of FIG. 8 taken generally along line 9-9 in FIG. 8.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
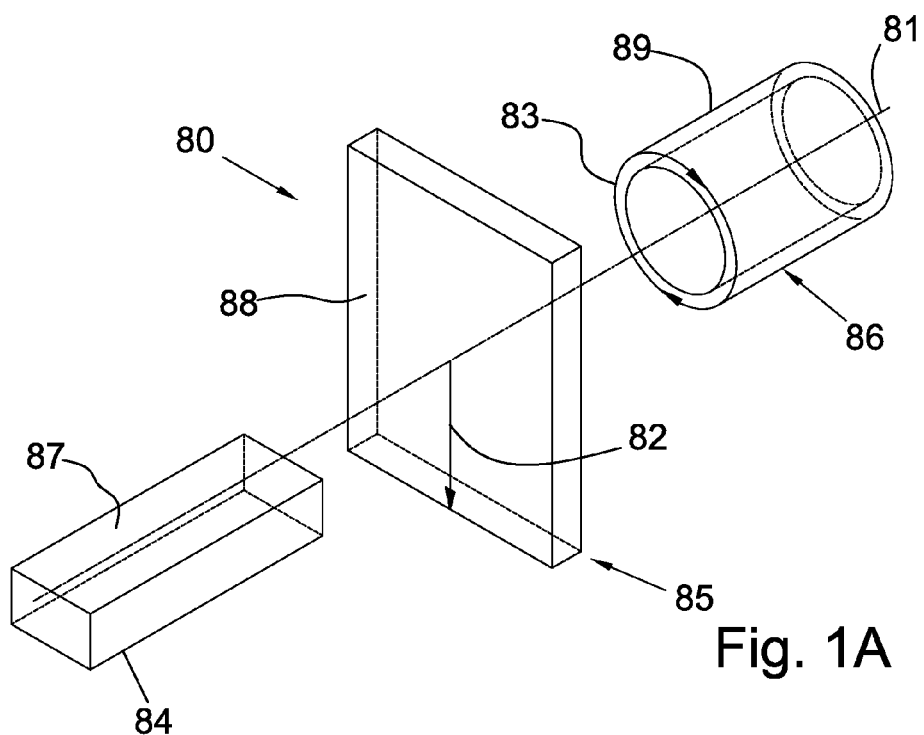
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
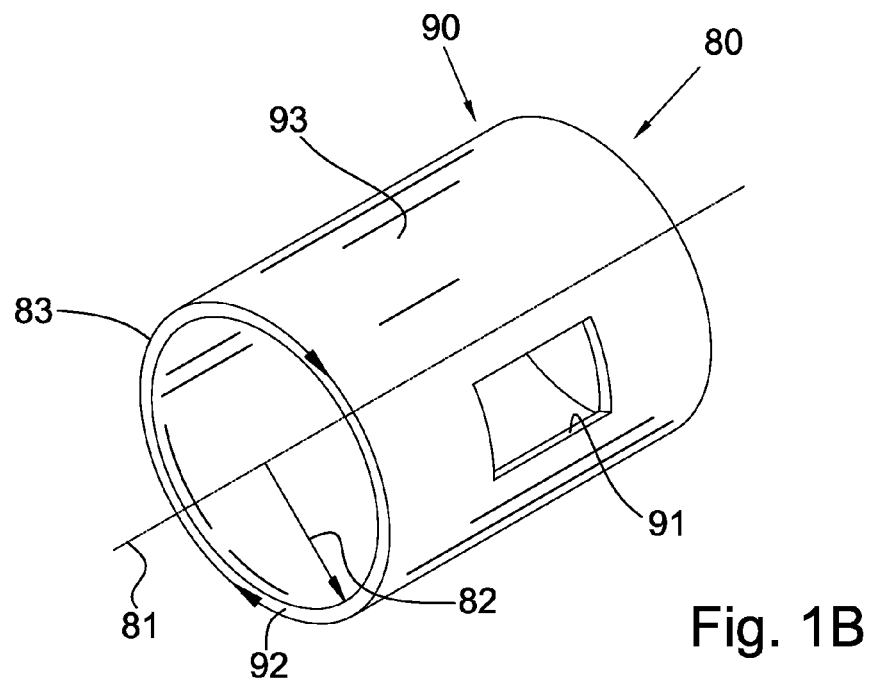
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
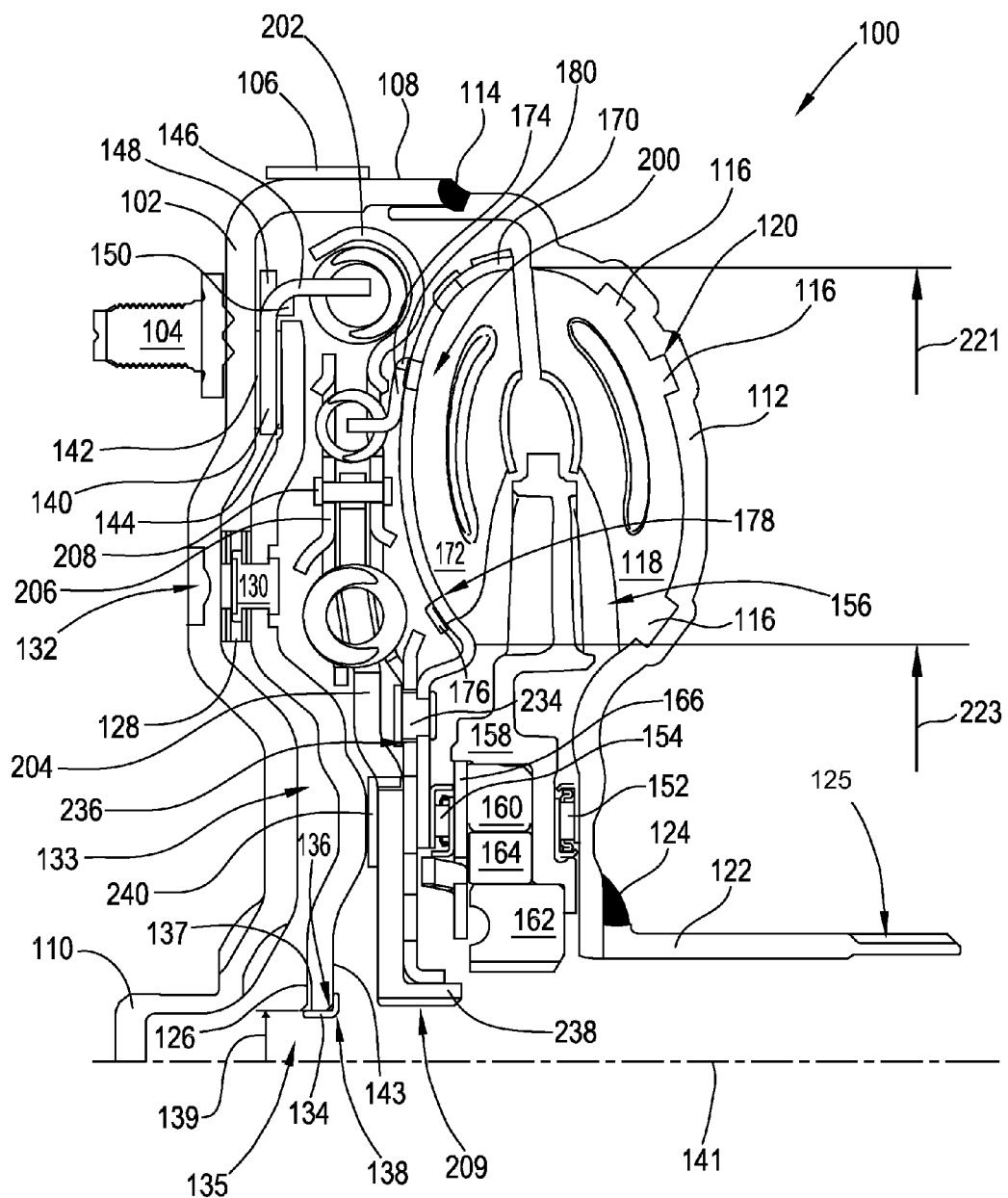
FIG. 2 is a top half cross sectional view of a torque converter configured with a turbine mass absorber according to an example aspect.

The following description is made with reference to FIG. 2. FIG. 2 is a top half cross sectional view of torque converter 100 configured with damper assembly 200 according to an example aspect. Torque converter assembly 100 includes cover assembly 102 arranged for driving engagement with a prime mover (i.e., an engine) at studs 104. In an example embodiment (not shown), cover assembly 102 is drivingly engaged with the prime mover through lugs (not shown). Balance weight 106 is attached (i.e., welded) to cover 102 at outside surface 108. Pilot area 110 is for radial positioning of torque converter 100 into a crankshaft of the prime mover (not shown).

Cover assembly 102 is fixedly attached to pump shell 112 at weld joint 114. Weld joint 114 creates a fluid-tight seal between cover assembly 102 and pump shell 112. Tabs 116 of blades 118 are disposed in slots 120 of shell 112. In an example embodiment, blades 118 are fixed to shell 112 by brazing, welding, or adhesives, for example. Pump hub 122 is fixedly attached to shell 112 at weld 124. Hub 122 is for radial positioning of torque converter 100 into a transmission (not shown) and for drivingly engaging a transmission pump (not shown) at spline 125, for example.

Piston plate 126 is drivingly engaged with cover assembly 102 via leaf springs 128. Leaf springs 128 are attached to piston plate 126 with rivets 130 and to cover assembly 102 with extruded rivets 132. Leaf springs 128 allow axial displacement of piston plate 126 relative to cover assembly 102. Piston plate assembly 133 for torque converter 100 includes piston plate 126 with opening 135 forming inner circumferential surface 137 at distance 139 from axis of rotation 141 for piston plate 126. Plate 126 includes radial surface 143 and chamfer surface, or chamfer portion, 136 connecting inner circumferential surface 137 with radial surface 143. Piston plate 126 is sealed to and centered relative to a transmission input shaft (not shown) by bushing 134 disposed in aperture 135 of plate 126. Piston plate 126 includes chamfer portion 136 for ease of assembly and clearance for bushing radius portion 138. That is, bushing 134 includes radius portion 138 proximate chamfer portion 136. During insertion of bushing 134 into opening 135, contact between axial portion 184 (ref. FIG. 9) and chamfer surface 136 facilitates axial displacement of bushing 134 along inner circumferential surface 137.

Bushing radius portion 138 allows easier assembly with the transmission input shaft. Otherwise stated, bushing 138 is arranged to seal piston 126 to the transmission input shaft and radius portion 138 is arranged to ease assembly of piston plate assembly 133 with the input shaft. For example, the input shaft may include an end chamfer and, during assembly of piston plate assembly 133 onto the input shaft, the chamfer aligns with radius portion 138, accommodating for radial misalignment between the components. In an example embodiment, bushing 134 includes a low-friction coating. Bushing 134 may have a Teflon® coating to reduce friction, for example.

Drive plate 140 is disposed axially between piston plate 126 and cover assembly 102. Drive plate 140 includes friction material ring 142 between plate 140 and cover assembly 102, and friction material ring 144 between plate 140 and piston plate 126. Drive plate 140 includes axial extension portion 146, radial extension portion 148, and centering portion 150. Centering portion 150 radially positions drive plate 140 relative to piston plate 126. Axial extension portion 146 is drivingly engaged with damper assembly 200 as described below.

Torque converter assembly 100 includes bearings 152 and 154, and stator assembly 156. Stator assembly 156 includes casting 158, outer race 160, inner race 162, rollers 164, and side plate 166. Races 160 and 162, and rollers 164 comprise a one-way clutch assembly for stator assembly 156. Assembly 100 further includes damper assembly 200 with turbine assembly 168. Assembly 168 includes shell 170, blades 172 and drive tab 174. Blades 172 include tabs 176 engaged with slots 178 in shell 170. In an example embodiment, blades 172 are brazed or welded to shell 170. Drive tab 174 is fixed to turbine shell 170 by weld 180, although tab 174 may be fixed to shell 170 using any method known in the art including brazing, adhesives, or mechanical attachment through tabs 176 or rivets (not shown).

Figure 3:
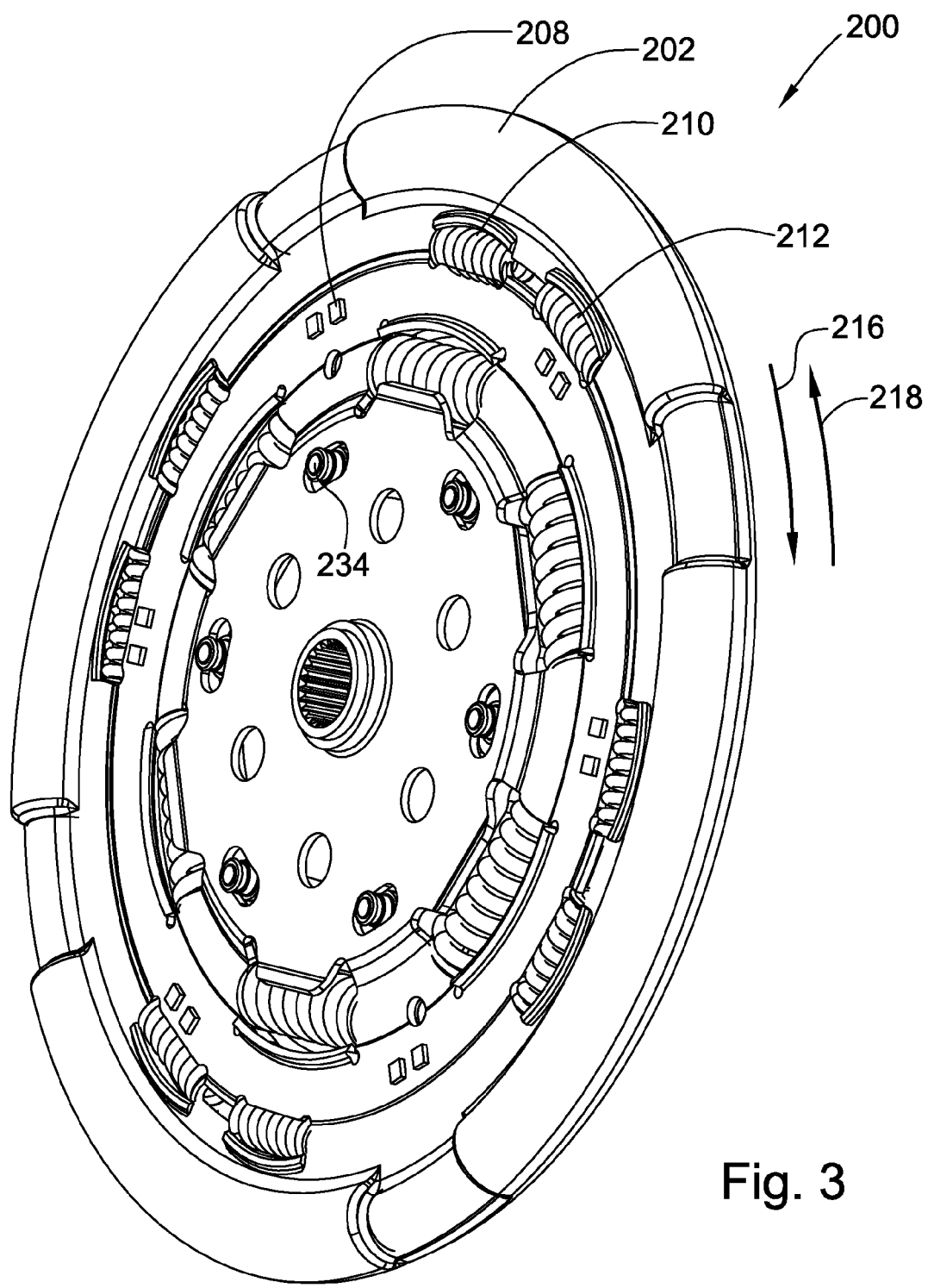
FIG. 3 is a front perspective view of a damper assembly according to an example aspect.
Figure 5:
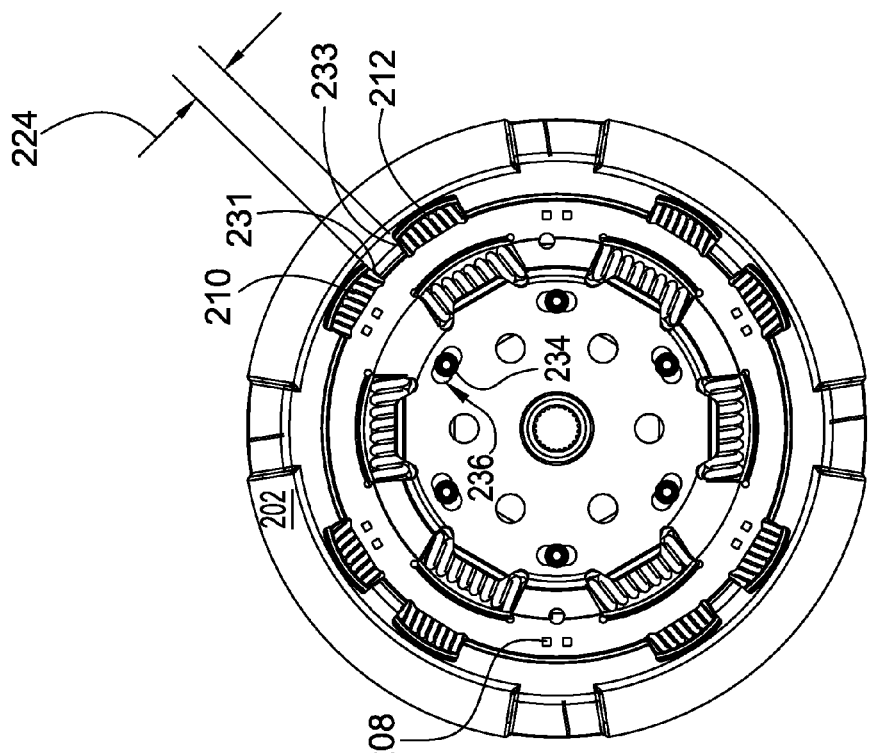
FIG. 5 is a back side view of the damper assembly of FIG. 3 according to an example aspect.
Figure 4:
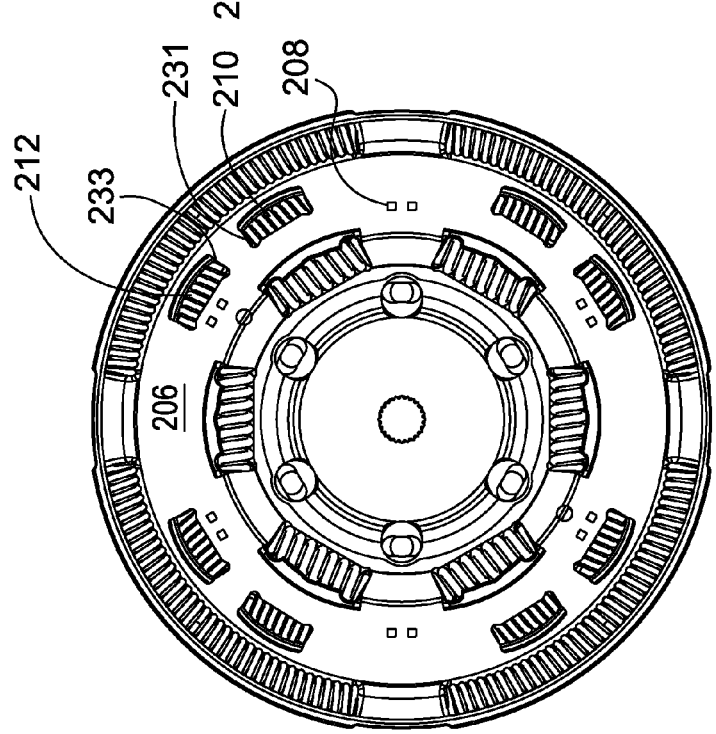
FIG. 4 is a front side view of the damper assembly of FIG. 3 according to an example aspect.
Figure 6:
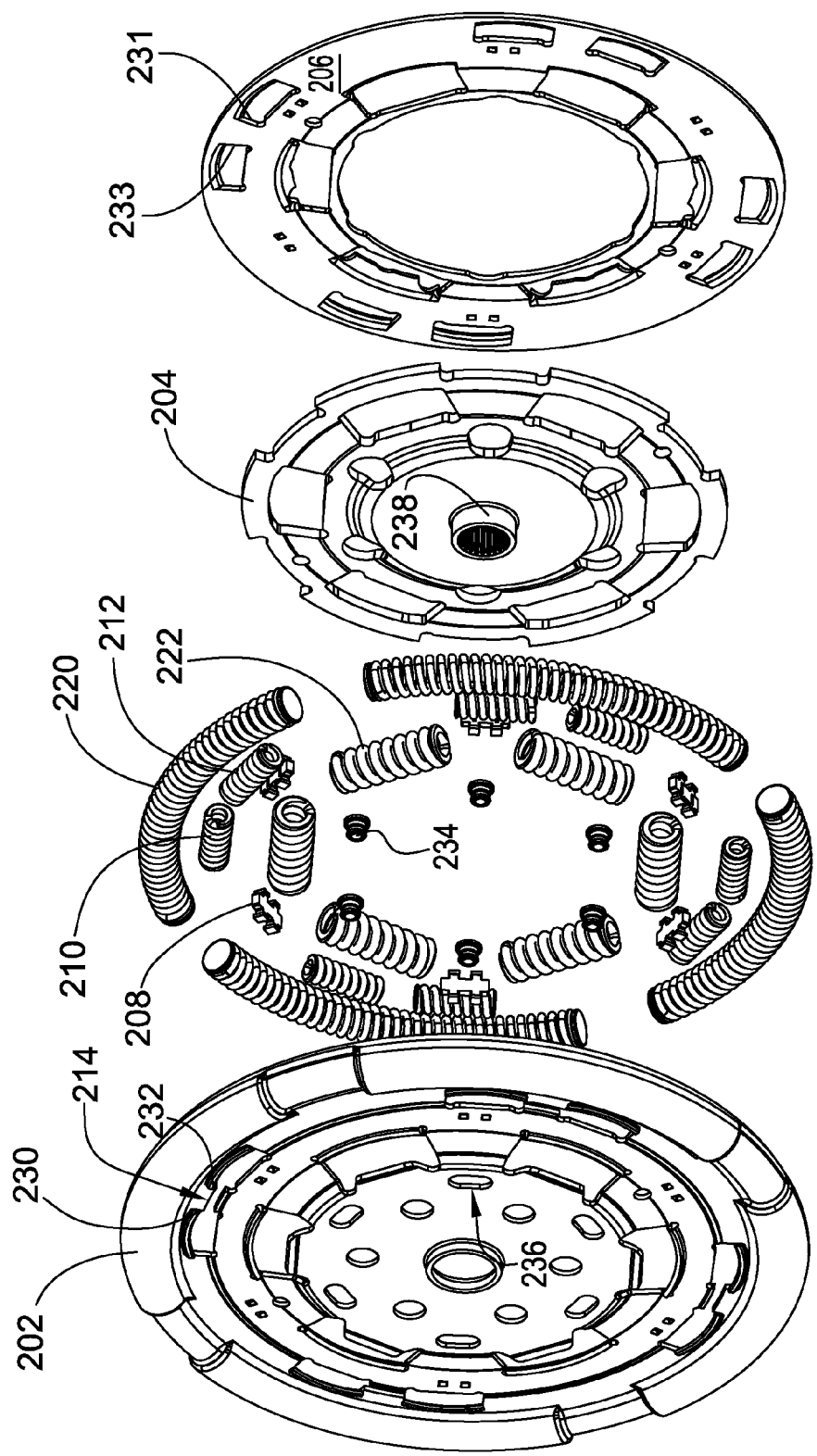
FIG. 6 is a front exploded view of the damper assembly of FIG. 3 according to an example aspect.

The following description is made with reference to FIGS. 2-6. FIG. 3 is a front perspective view of a damper assembly according to an example aspect. FIG. 4 is a front side view of the damper assembly of FIG. 3 according to an example aspect. FIG. 5 is a back side view of the damper assembly of FIG. 3 according to an example aspect. FIG. 6 is a front exploded view of the damper assembly of FIG. 3 according to an example aspect.

Damper assembly 200 includes connection plate 202, output hub 204, and cover plate 206. Plates 202 and 206 are fixedly attached by sheet metal rivets 208, for example. Output hub 204 is arranged for driving engagement with the transmission input shaft (not shown) at spline 209, for example. Damper assembly 200 further includes drive side elastic elements 210 and coast side elastic elements 212. In an example embodiment, elements 210 and 212 are coil springs. Connection plate 202 includes slot 214 allowing tab 174 from turbine assembly 168 to engage elements 210 and 212. That is, elements 210 and 212 are engaged with turbine 168. Elements 210 are arranged for transmitting torque to turbine 168 in direction of arrow 216, and elements 212 are arranged for transmitting torque to turbine 168 in a direction of arrow 218.

Damper assembly 200 further includes input damper, or spring set, 220 and output damper, or spring set, 222. In an example embodiment, input damper 220 comprises coil springs having an arcuate shape, and output damper 222 comprises coil springs. In an example embodiment, spring set 220 is disposed proximate radially outer diameter 221 of shell 170 and spring set 222 is disposed proximate radially inner diameter 223 of shell 170. Elements 210 and 212 are disposed in a torque path between dampers 220 and 222. That is, torque received by connection plate 202 from input damper, or spring set, 220 is transmitted by connection plate 202 to output damper, or spring set, 222. Therefore, connection plate 202 is in a torque path between dampers 220 and 222. Elements 210 and 212 are drivingly engaged with connection plate 202.

Damper 220 is engaged with axial tab 146 of drive plate 140. Plate 140 forms a portion of a torque converter clutch and is selectively engaged with cover 102 through operation of the clutch. Otherwise stated, spring set 220 is clutchingly engaged with cover 102 through plate 140. That is, engagement of the clutch is controlled by oil pressure acting on piston plate 126 so that in a torque converter mode, the clutch is disengaged and in a torque converter clutch mode, the clutch is engaged so that torque is transmitted from cover 102 to drive plate 140. Output damper 222 is drivingly engaged with the transmission input shaft (not shown) through output hub 204.

Elements 210 and 212 are disposed on either circumferential side of tab 174. Circumferential width of tab 174 is greater than circumferential width 224 of slot 214 so that elements 210 and 212 are compressed by tab 174 in a free state. That is, when damper 220 is not operated in a drive mode or a coast mode, end 226 of element 210 and end 228 of element 212 rest against circumferentially opposing edges of tab 174 instead of resting against respective edges 230 and 232 of plate 202 or edges 231 and 233 of plate 206. Furthermore, width of tab 174 is sufficient such that element 212 is partially compressed when element 210 is fully compressed and element 210 is partially compressed when element 212 is fully compressed. Otherwise stated, when drive side elastic element 210 is fully compressed by drive tab 174, coast side elastic element 212 urges drive tab 174 towards element 210, and vice-versa.

Damper 200 is drivingly engaged with turbine shell 170 through lash element 234. In an example embodiment, lash element 234 is a spacer bolt fixedly attached to shell 170 and engaged in slot 236 of connection plate 202. In another example embodiment (not shown), lash element 234 is a spline configuration with rotational lash between adjacent teeth. Slot 236 is configured to allow rotational displacement of turbine 168 relative to damper 200 for a predefined windup angle, allowing compression of elements 210 and 212. During torque converter mode, torque is transmitted through turbine 168, into lash element 234 and into connection plate 202. That is, elements 210 and 212 have a defined torque capacity and lash element 234 drivingly engages turbine 168 with connection plate 202 when a torque transmitted by turbine 168 exceeds the torque capacity. In an example embodiment, connection plate 202 is radially centered on flanged portion 238 of output hub 204. Thrust washer 240 is installed on hub 204.

Figure 7:
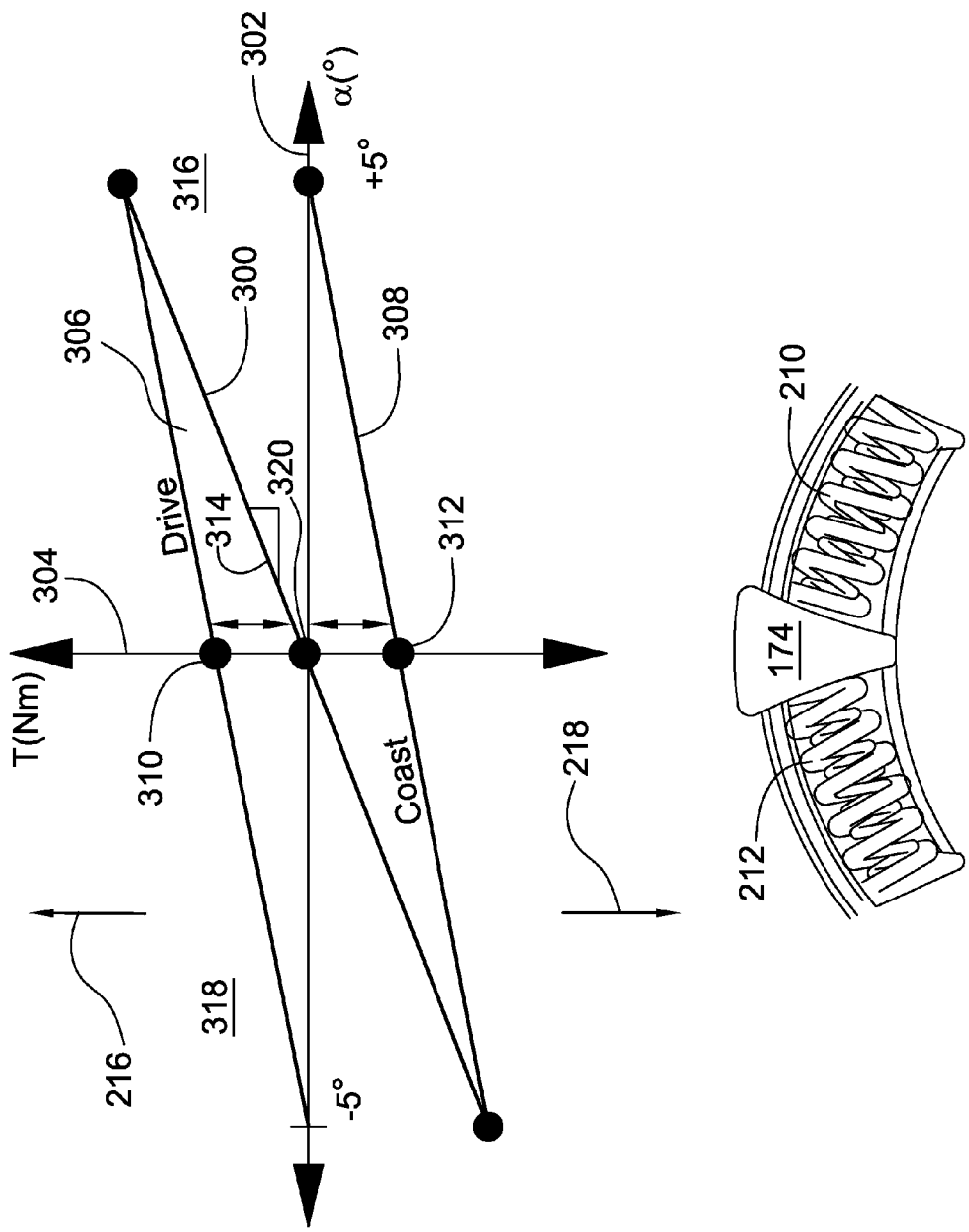
FIG. 7 is a graph of a windup curve for a turbine mass absorber according to an example aspect.

The following description is made with reference to FIG. 7. FIG. 7 is graph of windup curve 300 for a turbine mass absorber. Axis 302 is a measure of windup angle in degrees and axis 304 is a measure of transmitted torque in Newton-meters corresponding to directional arrows 216 and 218 in FIG. 3. Line 306 is a windup curve for individual element 210 and line 308 is a windup curve for individual element 212.

Damper 200 is designed to operate at +/−5 degrees for a total of 10 degrees of travel. Although a particular travel angle is referenced, damper 200 may be designed with other travel angles depending on the application. Elements 210 and 212 are each preloaded between respective edges 230/231 and 232/233, and tab 174. That is, at 0 degrees of windup, element 210 is urging tab 174 in direction of arrow 216 by the torque amount indicated by point 310, and element 212 is urging tab 174 in direction of arrow 218 by the torque amount indicated by point 312. The torque value indicated at points 310 and 312 have the same absolute value but different directions. That is, a sum of the torque indicated at points 310 and 312 is zero.

Line 300 is the sum of lines 306 and 308. Slope 314 of line 300 remains constant at a transition region between drive side 316 and coast side 318 indicated by point 320. That is, because both elements 210 and 212 are active through the entire windup of damper 200, the slope at the transition region remains constant. If there were lash between the two elements, the slope would experience a change at point 320 and performance of damper 200 would be negatively impacted. Otherwise stated, the slope of the torque curve for the damper remains constant in a transition region between transmitting torque to the turbine in a first, drive, direction and transmitting torque to the turbine in a second, coast, direction.

The following description is made with reference to FIG. 2 and FIGS. 8-9. FIG. 8 is a back view of bushing 134. FIG. 9 is a cross-section view of bushing 134 taken generally along line 9-9 in FIG. 8. Bushing 134 includes annular, or radial, portion 182 and axial protrusion or portion 184 with distal end 186. Portion 184 is in contact with inner circumferential surface 137 of piston plate 126 (FIG. 2). Portion 182 extends from end 187 of axial portion 184 and contacts radial portion 143 of piston plate 126 (FIG. 2). Annular portion 182 is arranged such that, during installation of the piston with the input shaft, portion 182 restricts axial motion of bushing 134, preventing the bushing from being axially dislodged from the piston aperture. In an example embodiment, axial protrusion 184 includes a radial taper (shown exaggerated by line 189 in FIG. 9). That is, diameter 188 of protrusion 184 proximate distal end 186 is less than diameter 190 of protrusion 184 proximate annular portion 182. Otherwise stated, outside diameter 191 of axial portion 184 at end 186 is less than inner circumferential surface distance 139 of piston plate 126. Outside diameter 191 increases from end 186 to end 187. In an example embodiment, diameter 188 is approximately 0.1 mm less than diameter 190.

Diameter 188 may increase when the piston is installed onto the input shaft. That is, the shaft may radially displace distal end 186 outward, effectively "sizing" bushing 134 to the input shaft. Tapering axial protrusion 184 allows improved sealing performance with minimal effects on drag. Bushing 134 includes circumferential discontinuity 192 and is formed by rolling. That is, radial portion 182 is discontinuous. Discontinuity 192 allows easier contraction of bushing 134 during installation with the piston plate, and easier expansion of distal end 186 during installation with the input shaft. In an example embodiment, bushing 134 allows some leakage at discontinuity 192 or slight sizing differences between the bushing and the input shaft, and that leakage lubricates the bushing interface to reduce heat and friction drag, and improve durability of the bushing-shaft interface.

Of course, changes and modifications to the above examples should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A piston plate assembly for a torque converter comprising:
    a piston plate including:
        first and second radial surfaces with a thickness therebetween; and,
        an aperture:
            forming an inner circumferential surface having a width at most equal to the thickness between the first and second radial surfaces; and,
            a chamfer surface connecting the first radial surface and the inner circumferential surface; and,
    a bushing installed in the aperture and including a radius portion proximate the chamfer portion, wherein the bushing is arranged to seal the piston directly to a transmission input shaft and the radius portion is arranged to ease assembly of the bushing onto the transmission input shaft.

2. The piston plate assembly as in claim 1, the bushing further comprising first and second circumferential surfaces, wherein the aperture inner circumferential surface is in contact with the bushing first circumferential surface, and wherein the bushing second circumferential surface is arranged for sealing directly to the transmission input shaft.

3. The piston plate assembly as in claim 1, wherein the bushing includes a low friction coating.

4. The piston plate assembly as in claim 1, wherein the bushing includes:
    an annular portion; and,
    an axial protrusion including a distal end and a radial taper such that a diameter of the protrusion proximate the distal end is less than a diameter of the protrusion proximate the annular portion.

5. The piston plate assembly as in claim 4, wherein the annular portion is arranged such that, during installation of the piston plate with the transmission input shaft, axial motion of the bushing away from the piston plate is prevented.

6. The piston plate assembly as in claim 1, wherein the bushing includes a circumferential discontinuity.

7. A piston plate assembly for a torque converter comprising:
    a piston plate including:
        first and second radial surfaces and a thickness therebetween;
        an opening forming an inner circumferential surface, having a width at most equal to the thickness, at a distance from an axis of rotation for the piston plate; and,
        a chamfer surface connecting the inner circumferential surface with the first radial surface; and,
    a bushing including an axial portion with an outer surface in contact with the inner circumferential surface and a radial portion extending from a first end of the axial portion and in contact with the first radial surface, wherein:
        a distance of the axial portion outer surface at a second end of the axial portion, opposite the first end, to the axis of rotation for the piston plate is less than the distance of the inner circumferential surface to the axis of rotation for the piston plate; and
        the distance of the axial portion outer surface at the second end of the axial portion to the axis of rotation for the piston plate is less than a distance of the axial portion outer surface at the first end of the axial portion to the axis of rotation for the piston plate.

8. The piston plate assembly of claim 7, wherein, during insertion of the bushing into the opening, contact between the axial portion and the chamfer surface facilitates axial displacement of the bushing along the inner circumferential surface.

9. The piston plate assembly of claim 7, wherein the radial portion is discontinuous in a circumferential direction.

10. A torque converter comprising:
an axis of rotation;
a cover;
a turbine including a turbine shell;
an impeller including an impeller shell;
a piston plate comprising:
    first and second radial surfaces and a thickness therebetween;
    an opening forming an inner circumferential surface, having a width at most equal to the thickness, at a distance from the axis of rotation; and,
    a chamfer surface connecting the inner circumferential surface with the first radial surface;
a bushing installed in the aperture and including a radius portion proximate the chamfer portion, wherein the bushing is arranged to seal the piston directly to a transmission input shaft and the radius portion is arranged to ease assembly of the bushing onto the input shaft; and;
a damper assembly comprising:
    an output hub; and,
    a flange arranged to spline directly to the transmission input shaft.

11. The torque converter as in claim 10, wherein the piston plate is disposed between the cover and the damper assembly.

12. The torque converter as in claim 10, further comprising a clutch including a drive plate disposed axially between the piston plate and the cover.

13. The torque converter as in claim 12, wherein the drive plate includes an axial tab engaged with the damper assembly.

14. The torque converter as in claim 10, wherein the transmission input shaft includes an end chamfer arranged for alignment with the radius portion.

15. The torque converter as in claim 10, the bushing further comprising first and second circumferential surfaces, wherein the opening inner circumferential surface is in contact with the bushing first circumferential surface, and wherein the bushing second circumferential surface is arranged for sealing directly to the transmission input shaft.

16. The torque converter as in claim 10, wherein the output hub is disposed axially between the piston plate and the turbine shell.

* * * * *